(12) United States Patent
Dorn et al.

(10) Patent No.: US 9,063,817 B2
(45) Date of Patent: Jun. 23, 2015

(54) APPLICATION PLATFORM AND METHOD FOR OPERATING A DATA PROCESSING ARRANGEMENT HAVING SUCH AN APPLICATION PLATFORM

(75) Inventors: Karlheinz Dorn, Kalchreuth (DE); Armin Michel, Erlangen (DE); Vladyslav Ukis, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 672 days.

(21) Appl. No.: 13/047,865

(22) Filed: Mar. 15, 2011

(65) Prior Publication Data
US 2011/0231832 A1 Sep. 22, 2011

(30) Foreign Application Priority Data
Mar. 17, 2010 (DE) .......................... 10 2010 011 658

(51) Int. Cl.
*G06F 9/44* (2006.01)
*G06F 9/445* (2006.01)

(52) U.S. Cl.
CPC ........................................ *G06F 8/65* (2013.01)

(58) Field of Classification Search
CPC ........................................................ G06F 9/44
USPC ........................................ 717/170, 169, 171
See application file for complete search history.

(56) References Cited

U.S. PATENT DOCUMENTS

| | | | |
|---|---|---|---|
| 6,591,417 B1* | 7/2003 | Strysniewicz et al. | 717/168 |
| 6,681,389 B1* | 1/2004 | Engel et al. | 717/173 |
| 8,407,787 B1* | 3/2013 | Lou et al. | 726/22 |
| 2001/0047289 A1* | 11/2001 | Mckee et al. | 705/9 |
| 2002/0052727 A1* | 5/2002 | Bond et al. | 703/26 |
| 2003/0229723 A1* | 12/2003 | Kangas et al. | 709/310 |
| 2004/0075857 A1* | 4/2004 | Akiyoshi et al. | 358/1.13 |
| 2005/0083940 A1* | 4/2005 | Eales et al. | 370/395.2 |

(Continued)

FOREIGN PATENT DOCUMENTS

DE    102006051189 A1    5/2008

OTHER PUBLICATIONS

German Office Action DE 10 2010 011 658.0, filed Mar. 17, 2010 (not yet published).

*Primary Examiner* — Chat Do
*Assistant Examiner* — Jae Jeon
(74) *Attorney, Agent, or Firm* — Harness, Dickey & Pierce, L.L.C.

(57) ABSTRACT

An application platform is disclosed together with a method for operating a data processing arrangement on which the application platform is implemented along with at least one application which is executable on the application platform by accessing at least one programming interface of the application platform. In at least one embodiment, in the course of a change of version of the application platform or of a part of the platform, a check is carried out by way of an update module to determine whether a newly-to-be-installed more recent version of the application platform or of the part of the platform is consistent with the existing older version of the application platform or of the part of the platform in terms of the interface specification and/or the behavior of the or each programming interface. If necessary, the update module overwrites the older version with the more recent version. Otherwise the update module installs the more recent version or at least its programming interface in parallel with the existing version or its programming interface.

23 Claims, 4 Drawing Sheets

(56) References Cited

U.S. PATENT DOCUMENTS

| | | |
|---|---|---|
| 2005/0160432 A1* | 7/2005 | Gallagher et al. ............ 719/313 |
| 2006/0222176 A1* | 10/2006 | Ohishi ............................ 380/51 |
| 2007/0083874 A1* | 4/2007 | Vasudevan et al. ........... 719/328 |
| 2008/0134206 A1* | 6/2008 | Stokes .......................... 719/315 |
| 2008/0222217 A1* | 9/2008 | Gallagher et al. ............ 707/203 |
| 2008/0271048 A1* | 10/2008 | Fradkov et al. ............... 719/311 |
| 2008/0320464 A1* | 12/2008 | Wahlstrom et al. ........... 717/170 |
| 2009/0199172 A1* | 8/2009 | Zhong et al. .................. 717/168 |
| 2011/0078674 A1* | 3/2011 | Ershov .......................... 717/170 |

* cited by examiner

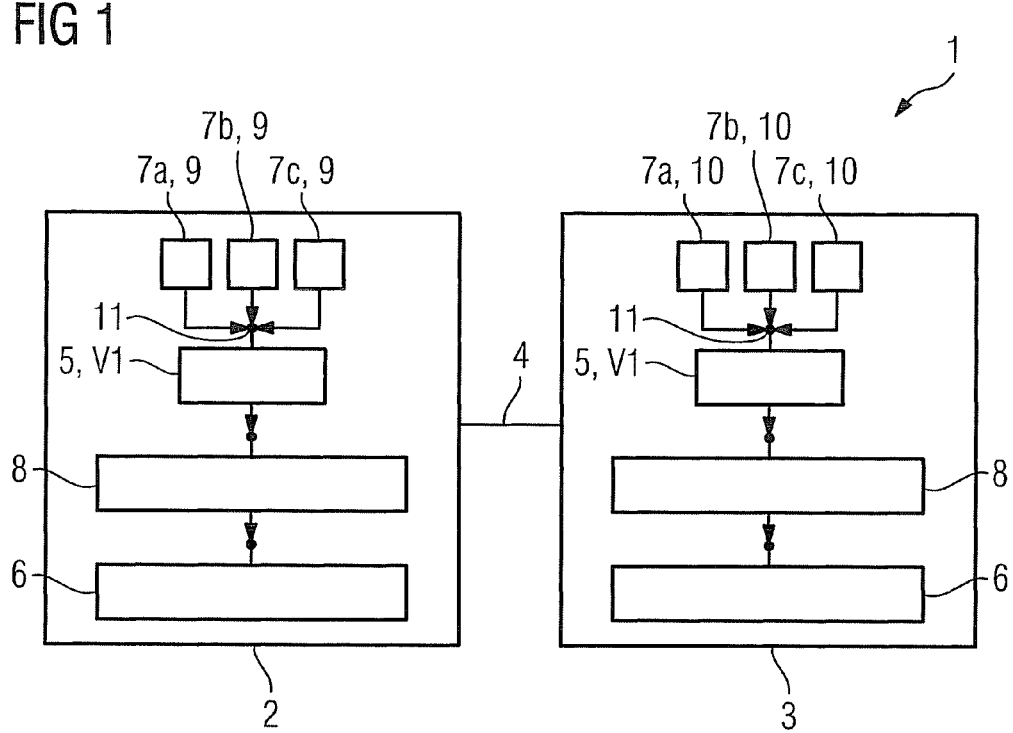
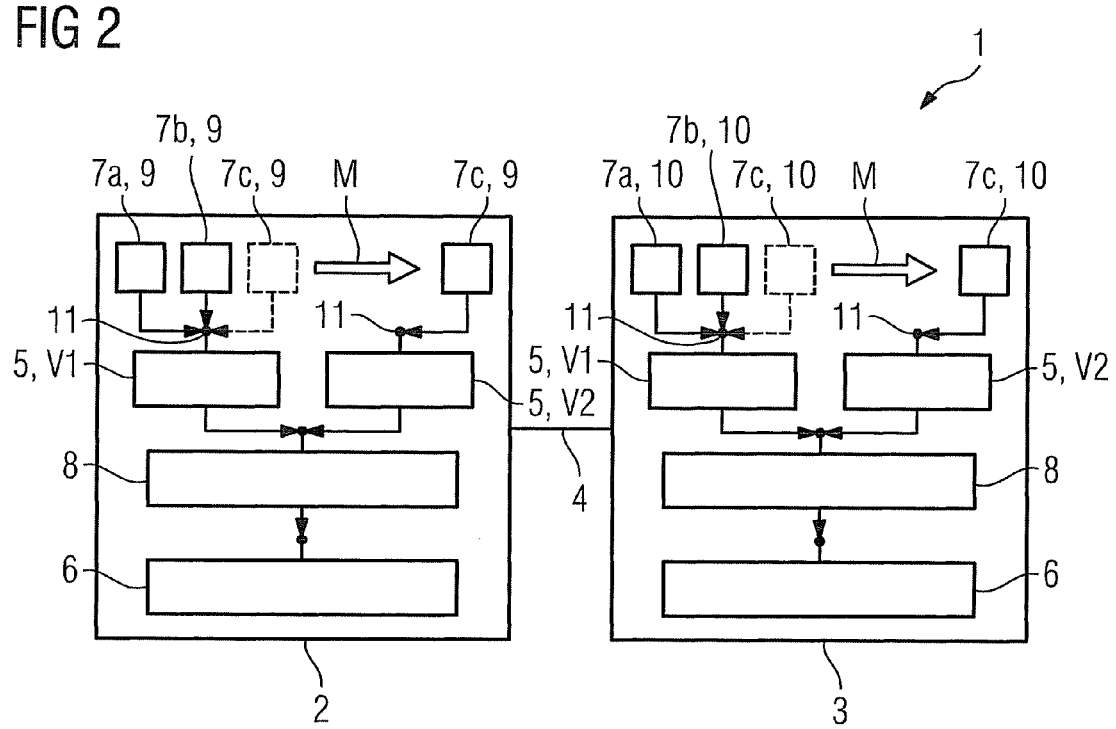

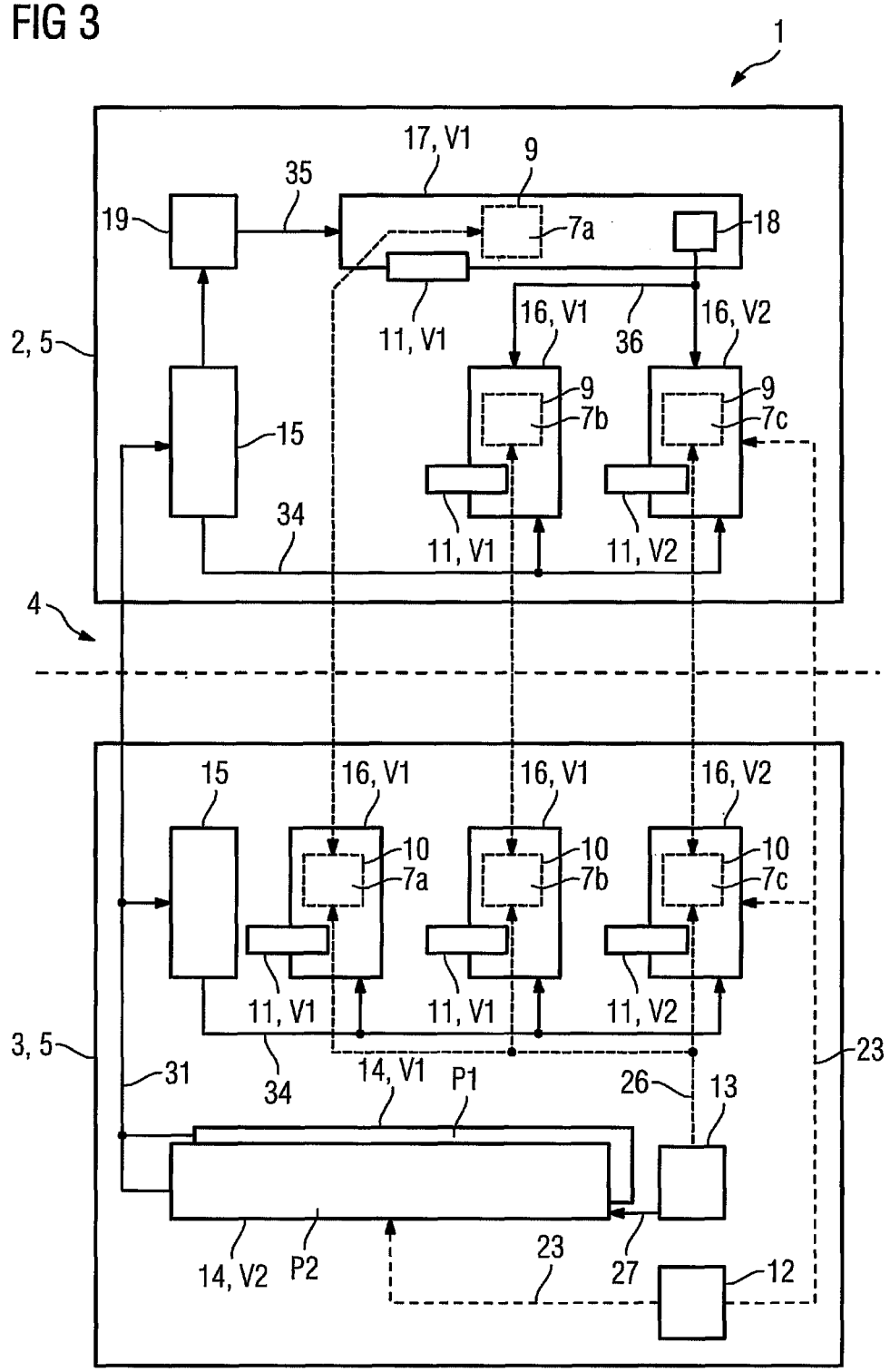

APPLICATION PLATFORM AND METHOD FOR OPERATING A DATA PROCESSING ARRANGEMENT HAVING SUCH AN APPLICATION PLATFORM

PRIORITY STATEMENT

The present application hereby claims priority under 35 U.S.C. §119 on German patent application number DE 10 2010 011 658.0 filed Mar. 17, 2010, the entire contents of which are hereby incorporated herein by reference.

FIELD

At least one embodiment of the invention generally relates to a method for operating a data processing arrangement, in particular a computer or a computer network, on which an application platform has been implemented along with at least one (software) application which is executable on the application platform through access to at least one programming interface of the application platform.

The term "application platform" denotes a (generic or domain-specific) software platform, i.e. an inter-application software solution that is interposed between the computer hardware with the operating system running thereon on the one hand and the applications, i.e. the actual application programs, on the other hand. A widely established example of such an application platform is J2EE (Java Platform, Enterprise Edition).

BACKGROUND

An application platform typically provides basic functions that are required by a multiplicity of applications, e.g. the reading, writing, deleting and archiving of data. Often an application platform also provides a user interface, i.e. functions such as graphical control elements, etc., via which applications can interact with a user for the purpose of inputting and outputting data. An application platform that is specialized for software applications in the medical field often also provides medically relevant basic functions in addition, e.g. algorithms for inspecting, analyzing and processing medical images. The function portfolio that is made available by an—in particular specialized—application platform enables the development time for software applications to be shortened significantly, in particular in the medical environment.

To allow easy access to the functions of an application platform, the latter generally provides what is termed an application programming interface (API) or a plurality of such programming interfaces (APIs), the functions of which can be integrated into the applications that are to be created. Furthermore an application platform sometimes provides what is termed an (application) container in which an application or, in the case of multi-layered applications, a layer of an application runs in encapsulated form. In this case the container controls the execution sequence of the application, in particular the program start and the termination of the application. In addition at least part of the API(s) is typically implemented as a component part of the container. Often, however, the APIs also include additional functions which are implemented independently of the container and which the applications can also access accordingly independently of the container.

The term "function" signifies both here and in the following description in general a functional component of a software program. Such a function can also be realized as a "method" within the context of object-oriented programming or in another form.

By providing a container a correspondingly embodied application platform particularly effectively supports the development of multi-layered, distributed applications, in other words applications that comprise a plurality of mutually independently running parts (layers) which interact with one another via the application platform. In this case medical engineering applications frequently include in particular a so-called frontend layer, the primary purpose of which is interaction with the user, and a so-called backend layer, in which most of the actual calculations are performed. In a computer network, as commonly used these days in medical institutions, the backend layer is in this case implemented mostly in a central server, while the frontend layer is implemented on a client, i.e. a workstation. The application platform is in this case implemented both on the server side and on the client side and also supports the communication between these hardware devices. In this arrangement the frontend layer and the backend layer are encapsulated by the application platform usually in a separate container in each case.

In a typical data processing system of a contemporary medical institution a multiplicity of different medical engineering applications are often implemented on a shared, cross-network application platform. A full or partial update of the application platform, i.e. a change from an older version of the application platform or a part of the platform to a more recent version of the same application platform or part of the platform often proves to be problematic in the case of such a complex system. This is because when there is change of version of an application platform, frequently the specification and/or behavior of an API or a plurality of APIs is also changed to a greater or lesser degree, as a result of which the compatibility of the (new) API(s) with the applications already present before the update is sometimes compromised or destroyed altogether. In order to ensure error-free operation of these applications, the existing applications must in this case be "migrated" to the new platform version, i.e. adapted to match the specification and/or behavior of the new API(s).

Where there are a large number of applications based on a common application platform the amount of effort involved in performing a platform update is often considerable because usually all of the applications must be migrated. In the case of applications which are subdivided into frontend and backend components it is necessary in addition to update both application layers of each application when the application platform is updated. Following the update full tests of every modified application must be run, the tests being particularly exhaustive and time-consuming most notably in the medical field. This causes a heavy workload on the one hand. In the worst case an update of the application platform can also lead to a comparatively long downtime of the medical institution. The development advantage achieved through the use of the application platform is often substantially diminished as a result.

SUMMARY

In at least one embodiment the invention, a method is disclosed for operating a data processing arrangement having an application platform and at least one application running thereon, which method enables a flexible and easy-to-handle version change (update) of the application platform or a part of the same. A further embodiment of the invention discloses an application platform that is particularly suitable for performing the method.

With regard to at least one embodiment of the method, advantageous embodiment variants and developments of the invention will emerge from the claims and the following description.

According to at least one embodiment of the invention, the application platform includes at least one programming interface (API), though generally it includes a plurality of functionally delimited programming interfaces (APIs), by accessing which at least one application is executable on the application platform. The application platform additionally includes an update module.

In the event of a change of version of the application platform or of a part of the platform, a check is carried out by the update module to determine whether a more recent version of the application platform that is to be newly installed is consistent with the existing older version of the application platform in terms of the interface specification or the interface behavior of the or each API.

What is to be understood as "(interface) specification" in this context is the totality of criteria that an application accessing the API must comply with in order to be compatible with the API. These criteria include for example the nomenclature for the functions of the API and the definition of arguments (i.e. variables) of these functions.

What is referred to as "(interface) behavior" in this context is the totality of those characteristics of an API which become apparent only at platform runtime. In this case the behavior of an API is determined in particular by the response time or computing time associated with the invocation of each API functionality, the accuracy of return values of such functionalities, etc.

Provided the APIs or each API of the more recent and older version of the application platform are consistent in terms of the interface specification and interface behavior it is thereby ensured that the applications running on the older version of the application platform are also compatible with the more recent version. In this case the update module causes the older version of the application platform or part of the platform to be overwritten by the more recent version. Alternatively, if it is established by the update module that the more recent version of the application platform or part of the platform is not consistent in terms of the interface specification or interface behavior with an API of the older version, in other words exhibits compatibility-breaking modifications, the update module initiates the installation of the more recent version of the application platform or part of the platform or at least of the API that has been modified in a compatibility-breaking manner in parallel (side-by-side) with the existing, older version of the application platform or part of the platform or of the API.

Generally, the application platform is a software product whose component parts are configured for the purpose of performing the above-described method or one of its below-described variants by programming means, such that the method is automatically performed when the application platform is implemented on a data processing arrangement and executed. The update module and the API or each API are software components of the application platform.

Owing to the possibility of installing multiple versions of the application platform or its API(s) in parallel it is made possible for each of the applications implemented on the data processing arrangement to access a corresponding compatible version of the API(s) in accordance with its respective interface compatibility. If a plurality of applications are implemented on the data processing arrangement, then in this case in particular some of the applications can access the API(s) associated with the older platform version, while other applications access the API(s) associated with the more recent platform version. In the event of an update of the application platform in which at least one API is modified in a compatibility-breaking manner there is therefore no necessity to migrate the applications running on the application platform immediately. Rather, the applications can be migrated progressively and successively to the more recent version or even left long-term in the previous state. In this way it is ensured that the platform update does not lead, or at least leads only to a negligible degree, to downtimes of the data processing arrangement or the applications implemented thereon. In addition the workload associated with the migration of the applications can be divided up in a flexible manner, in particular can be "stretched" over time. Furthermore one and the same application can also be implemented in multiple versions in parallel. For example, in addition to a version migrated to a new platform version of a particular application the older version of the same application running on an older platform version can be maintained.

Furthermore the compatibility check of the API(s) performed by the update module ensures that the different platform versions are not installed "blind" next to one another, but are installed only when this is necessary due to the established incompatibility of the API(s). The number of versions of the application platform that are implemented on the data processing arrangement over the long term is thus limited to a minimum, thereby saving memory space and reducing the complexity of the overall software structure implemented on the data processing arrangement.

The compatibility check performed by the update module can basically be carried out in different ways. In a simplest method variant, and therefore one that is used by preference, the more recent, newly-to-be-installed version of the application platform includes a specific indication, attached by the vendor, relating to its compatibility with one or more previous versions of the application platform. This information, which directly indicates whether the interface specification and/or the interface behavior of the two API versions are consistent, is in this case read out by the update module.

In an alternative method variant each version of the application platform includes details concerning the corresponding interface specification and/or the interface behavior which the update module in this case reads out and compares with one another. Again as an alternative hereto it is conceivable for the update module to test the API(s) of the more recent version for compatibility. Hybrid forms of these three alternatives are also conceivable within the scope of at least one embodiment of the invention. In particular it can be provided that the compatibility in terms of the interface specification is determined on the basis of stored information, while the compatibility in terms of the interface behavior is established by way of tests.

Insofar as multiple versions of the application platform, individual platform components and/or API(s) have already been installed in parallel in the course of a single or multiple platform update, a check is carried out by a version management module during the loading of each application to determine with which of the installed platform versions the application is compatible. In this case the API(s) of the corresponding compatible version is (are) selected by the version management module, which is a further software component of the application platform that is provided in this case, and made available. The loaded application is in this case executed in particular in a container originating from the corresponding platform version and containing the API(s), or at least a part thereof. The container in this case contains in particular the API(s) which include functions for what is referred to as the "lifecycle" of the associated application, in particular the starting, stopping, suspending or reawakening of the application.

The version management module communicates with the containers preferably using a specific protocol defined by corresponding specifications. In an example embodiment of the invention, if multiple versions of the protocol exist, multiple versions of the version management module are implemented in parallel, each of these versions of the version management module using one of the different versions of the protocol in each case. The protocol versions do not necessarily correspond to the versions of the application platform in this case. In particular it is conceivable that the continuing development of the protocol used progresses at a slower pace than that of the application platform, with the result that a number of succeeding versions of the application platform will use the same protocol version.

The different versions of the version management module are preferably cascaded internally, i.e. implemented in a specified access sequence. In this case all requests for starting and managing a container instance are always addressed initially to the most recent version of the version management module, the version of the version management module first checking whether it tallies with the container required for the affected application in terms of the protocol version used. If incompatibility is established the most recent version of the version management module delegates the request to that older version of the version management module which is compatible with the application, in other words the one which is compatible in terms of the protocol used with a container which is in turn compatible with the application.

In an example embodiment of the method, multi-layer applications having a frontend layer and a backend layer are supported by the application platform. In this case the frontend layer and the backend layer are each provided with one or more API(s) and if necessary a container instance by the application platform. It is ensured by the version management module in this case that the frontend layer and the backend layer of the same application are always assigned API(s) or containers of the same version. In other words the version management module ensures that the frontend layer and the backend layer are not provided with API(s) or containers which come from different versions of the application platform.

Basically, the API(s) or containers assigned in each case to the frontend layer and the backend layer can have a different structure. Alternatively hereto, in a particularly simple method variant, essentially identically structured API(s) and where applicable identically structured containers are made available both for the frontend layer and for the backend layer of an application. In this case the version management module accordingly allocates the frontend layer and the backend layer of the application two instances of the same API(s) or of the same container in each case.

The application platform beneficially supports the simultaneous execution of a plurality of applications. Each of the parallel-running applications or application layers (in the case of multi-layer applications) together with the possibly assigned container forms a separate (operating system) process in each case, such that a plurality of such processes regularly run in parallel.

In order to make it easier for a user of the data processing arrangement to handle the concurrently running processes, in a beneficial variant of at least one embodiment of the invention the application platform additionally includes a process connection module which generates an inter-process user interface by means of which the parallel-running processes collectively interact with the user of the data processing arrangement. Notwithstanding this, however, in multi-layered applications having a frontend layer and a backend layer this relates only to the processes assigned to the frontend layer, especially since the processes assigned to the backend layer by definition have no direct user interaction.

As a result of the shared, inter-process user interface the plurality of processes (or, as the case may be, the underlying applications in each case) appear externally like a single process. The user can switch between different processes or applications via the shared user interface without being aware of it. In a beneficial embodiment of the invention, in particular a common frame is provided in this case for the parallel-running processes by the inter-process user interface. In this case the user interface is for example part of a special container which controls the output functions of the containers of the remaining (frontend) processes, in particular allocating an output position within the frame to the containers.

All the above-described variants and embodiments of the method according to the invention and of the associated application platform can—as far as possible—be used with one another in any combination.

BRIEF DESCRIPTION OF THE DRAWINGS

An example embodiment of the invention is explained in more detail below with reference to the drawings, in which:

FIG. 1 shows in a schematic block diagram a data processing arrangement with a server and a client, as well as with an application platform implemented on the server and the client prior to a platform update, FIG. 2 shows in a representation according to FIG. 1 the data processing arrangement after the update of the application platform, FIG. 3 shows in a schematic block diagram the structure of the application platform in greater detail.

Figure 4:
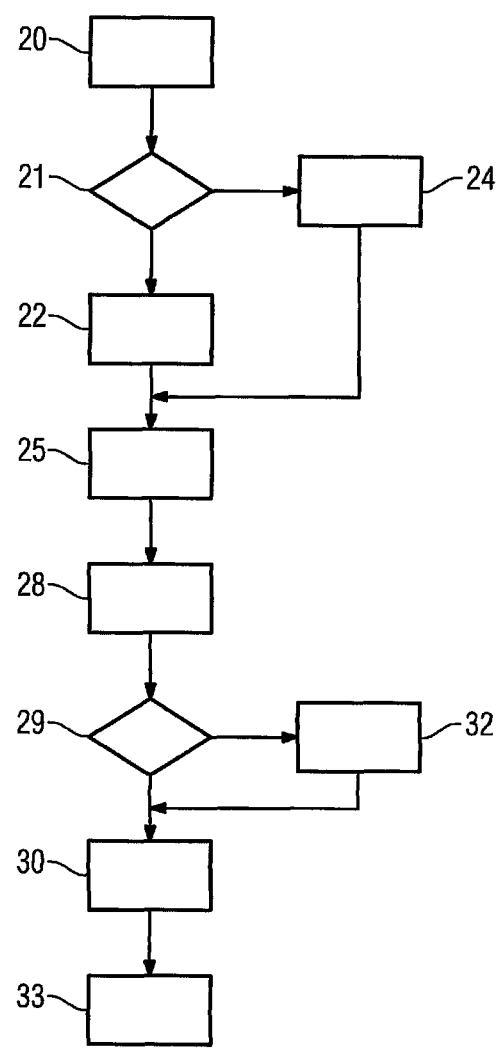
FIG. 4 shows in a flow diagram a method for operating the data processing arrangement performed by the application platform.

Parts, quantities and structures corresponding to one another are labeled consistently with the same reference signs in all the figures.

DETAILED DESCRIPTION OF THE EXAMPLE EMBODIMENTS

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items.

It will be understood that when an element is referred to as being "connected," or "coupled," to another element, it can be directly connected or coupled to the other element or intervening elements may be present. In contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

The data processing arrangement 1 shown in rough schematic form in FIG. 1 is provided by way of example for use in a medical institution such as e.g. a clinic. The data processing arrangement 1 comprises a plurality of clients 2 (only one of which is depicted for the sake of simplicity) and a central server 3. The clients 2 and the server 3 are connected for data transmission purposes by means of a (data communication) network 4 such as e.g. a so-called LAN (Local Area Network).

In this arrangement an application platform 5 is implemented on each client 2 and on the server 3. Within the framework of the software architecture built on the clients 2 and the server 3 the application platform 5 is interposed between an operating system 6 and a plurality of (software) applications in each case. Three applications 7a, 7b and 7c are shown by way of example in this case in FIG. 1.

In the example shown the application platform 5 does not sit directly on top of the operating system 6 of the clients 2 or of the server 3. Rather, a runtime environment 8 is interposed here between it and the application platform 5 in each case. Examples of the runtime environment 8 used are the so-called JAVA Runtime Environment or the .NET Framework.

Each of the applications 7a-7c itself comprises two layers in each case which are implemented distributed over the clients 2 and the server 3, namely a frontend layer 9 implemented on the client side and a backend layer 10 implemented on the server side. For the purpose of communicating with the applications 7a-7c the application platform 5 provides a plurality of programming interfaces, both on the client side and on the server side, which are accessed by the frontend layers 9 and backend layers 10 of the applications 7a-7c. For reasons of simplification reference is made in the following, without loss of generality, to just one programming interface (referred to below as API 11) by way of example.

FIG. 1 shows the data processing arrangement 1 in its original state, in particular prior to an update of the application platform 5. In this state the application platform 5 is present in a version V1 by way of example. In the course of an update this older version V1 is to be replaced by a more recent version V2 of the application platform 5.

During the update of the application platform 5 an automatic check, described in more detail below, is now carried out to determine whether the API 11 of the more recent version V2 that is to be installed is consistent in terms of the interface specification and the interface behavior with the API 11 of the existing version V1. If this is the case, the existing version V1 of the application platform 5 is overwritten both on the client side and on the server side by the more recent version V2. In this case the end state of the data processing arrangement 1 upon completion of the update continues to correspond to the representation according to FIG. 1, notwithstanding the fact that the application platform 5 is now present in version V2 on both the client side and the server side.

If, on the other hand, it is established during the update that the API 11 of version V2 of the application platform 5 is not consistent in terms of its interface specification or interface behavior with the API 11 of the existing version V1, then the more recent version V2 of the application platform 5 is implemented in parallel (side-by-side) with the existing version V1. In this case, upon completion of the update both versions V1 and V2 of the application platform 5 are therefore present in each case—as shown in FIG. 2—both on the client 2 and on the server 3.

Immediately after the update the applications 7a-7c that are compatible with the older version V1 of the application platform 5 still access the API 11 of the older version V1 as previously. Thanks to the parallel implementation of the two versions V1 and V2 the applications 7a-7c can now, as shown in FIG. 2 based on the example of the application 7c, be updated to the more recent version V2 by means of migration M, i.e. by means of corresponding code changes. FIG. 2 shows by means of continuous lines an intermediate state in which the applications 7a and 7b still access the API 11 of the older version V1, while the application 7c has already been migrated to the more recent version V2.

As can be seen from FIG. 2, both the frontend layer 9 and the backend layer 10 of the application 7c must be migrated.

It can be provided that all the component parts of the application platform 5 are always implemented in both versions V1 and V2 in parallel. Preferably, however, the continuing development of individual components and modules of the application platform 5 is always carried out on a backward-compatible basis by virtue of predefined specification. In this case preferably only the remaining components of the application platform 5, in particular the API 11, are implemented in parallel in both versions V1 and V2 in a compatibility-breaking version transition. The backward-compatible components of version V1 are overwritten without a separate check by the corresponding components of version V2 and interact as necessary with the remaining components of version V1 or version V2.

As is evident from FIG. 3, the application platform 5 includes an update module 12 which controls the update process. The update module 12 is shown by way of example in FIG. 3 as a fixed software component of the application platform 5 implemented on the server side. Alternatively thereto, however, the update module 12 can also be implemented separately from the actual application platform 5. In particular the update module 12 can be part of a setup program which is assigned to the application platform 5 and which is no longer required following completion of the update and accordingly can be deleted from the memory assigned to the data processing arrangement 1.

The application platform 5 also includes an application start module 13. This software module is configured by programming measures to initiate the start of the applications 7a-7c running on the application platform 5. The software module is likewise implemented on the server side in the example according to FIG. 3. Alternatively hereto, however, the application start module 13 could also be implemented on the client side.

The application platform 5 additionally includes a version management module 14 as a central component on the server side. The main function of the software module resides in selecting, starting and managing the API 11 and container instances 16, 17 in a compatible version V1 or V2 for each application 7a-7c that is to be started during the operation of the application platform 5.

In order to start the respective associated container instances 16, 17 the application platform 5 includes a container start module 15 of the invention disclosure, the software module being implemented both on the client side and on the server side.

During the operation of the application platform 5 a container instance 16 is generated both on the client side and on the server side for each application 7a-7c running thereon, which container instance 16 encapsulates the frontend layer 9 and/or the backend layer 10 of the respective application 7a-7c. The API 11 is implemented in part as a component of the container instances 16, 17. In addition, however, the API 11 also includes components which are independent of the container instances 16, 17.

Essentially, identical container instances 16, in other words instances (i.e. embodiments or exemplars) of the same container, are used on both client side and server side. Thus, in particular the container instances 16 encapsulating the frontend layer 9 and the backend layer 10 of the same applications 7b and 7c are identical in each case. In a departure from the basic principle, presented with reference to the applications 7b and 7c, that frontend layers 9 and backend layers 10 are always encapsulated by means of identical container instances 16, the frontend layer 9 of the first application 7a is encapsulated in a modified container instance 17. The container instance 17 additionally includes a user interface 18 which provides a common frame 40 (FIG. 5) for the frontend-side containers 16 and 17 of all the running applications 7a, 7b and 7c. In order to generate and control the container instance 17 the application platform 5 includes on the client side a software module referred to as a process connection module 19.

For each application 7a to 7c, the version management module 14 always selects the API 11 and the container instances 16, 17 in the version V1,V2 that is compatible with the respective application 7a-7c. Analogously to the example according to FIG. 2, in which the applications 7a and 7b are compatible with version V1, and the application 7c following its migration M is compatible with version V2, the API and the container instances 16, 17 are therefore selected in version V1 for the applications 7a and 7b, while the API and the container instances 16 are selected in version V2 for the application 7c.

The version management module 14 communicates with the container instances 16 and 17 using a specific protocol which may possibly be present in different protocol versions P1 and P2. Solely by way of example, the container instances 16, 17 in version V1 use protocol version P1, whereas the container instances 16, 17 in version V2 use protocol version P2. In order to be able to manage both container versions, the version management module 14 is therefore also implemented in multiple versions V1 and V2 in parallel, the version management module 14 in version V1 in this case, by way of example, supporting protocol version P1, while the version management module 14 in version V2 supports protocol version P2.

Referring to FIG. 4, the principle of operation of the application platform 5 is described in more detail with the aid of a schematically simplified flowchart which represents a typical process workflow during the update of the application platform 5 and the subsequent loading of the applications 7a to 7c.

According thereto, in the course of the update process the update module 12 reads out in a first step 20 information which is assigned to the newly-to-be-implemented version V2 of the application platform 5 and which specifies the interface compatibility of version V2 with the existing version V1. In a following step 21 the update module 12 checks the information that has been read out. If the result of this check is that the API 11 of version V2 has been modified in a compatibility-breaking manner compared to the API 11 of the existing version V1, then in a following step 22 the update module 12 initiates the parallel implementation of the application platform 5—or at least of the parts thereof that are not backward-compatible—in versions V1 and V2. In so doing the update module 12 installs in particular the API 11, the containers and the version management module 14 of version V2 in parallel with the corresponding software components of the existing version V1, as indicated by means of dotted arrows 23 in FIG. 3.

If, on the other hand, the check performed in step 21 reveals that the API 11 of version V2 has not been changed, or has been changed merely in a non-compatibility-breaking manner compared to the API 11 of version V1, then in step 24 the update module 12 installs the new version V2 over the existing version V1. The update process is therewith completed.

One of the applications 7a-7c is started directly or indirectly succeeding in time by the application start module 13, which in a step 25 commences with the loading of the application 7a-7c that is to be launched (arrow 26 in FIG. 3). The application start module 13 simultaneously issues a request to the version management module 14 of the most recent available version V2 to generate container instances 16, 17 (arrow 27 in FIG. 3). In a following step 28 the version management module 14 reads out specifications relating to the interface configuration of the loaded application 7a-7c.

In a further step 29 the version management module 14 checks in the initially active version V2 whether the container version required by the loaded application 7a-7c is compatible with the protocol version P2 supported by it.

If this is the case, then in a step 30 the version management module 14 present in version V2 activates the container start modules 15 implemented on the server side and client side (as indicated by an arrow 31 in FIG. 3). Otherwise, in a step 32, the version management module 14 present in version V2 passes on the request to the version management module 14 corresponding to the older version V1, which now for its part activates the container start modules 15 (step 30 in FIG. 4 or arrow 31 in FIG. 3).

The container start modules 15 now generate on the client side and server side one container instance 16, 17 each of version V1 or V2 required by the respective application 7a-7c (step 33 in FIG. 4, indicated by arrows 34 in FIG. 3).

In this case, at the start of the first application 7a, the container instance 17 is started on the frontend side by the container start module 15 through the medium of the process connection module 19 (arrow 35 in FIG. 3). All subsequently started applications 7b and 7c and their frontend-side container instances 16 are allocated an associated position in the common frame 40 or window created by the user interface 18 by the container instance 17 (arrow 36 in FIG. 3).

Figure 5:
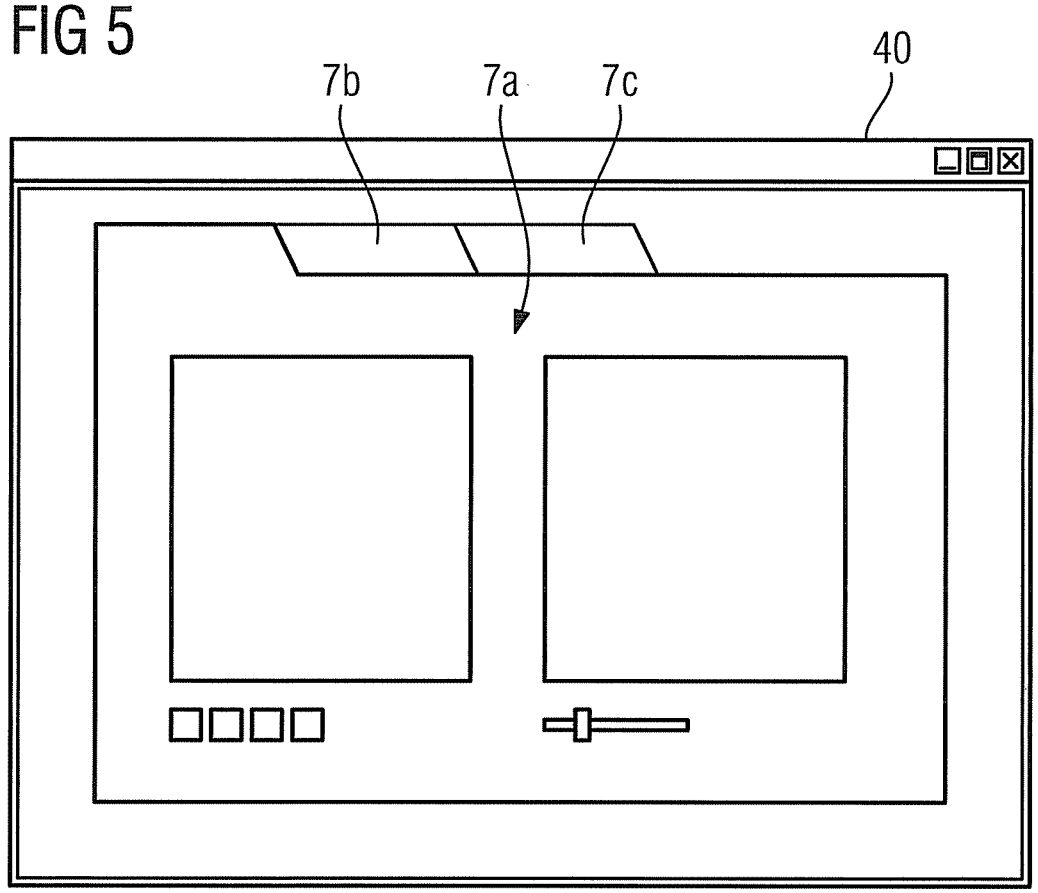
FIG. 5 shows in a schematic representation the output of a user interface provided by the application platform for a plurality of (software) applications running on the application platform.

The screen output generated by the user interface 18 is shown by way of example and in schematically simplified form in FIG. 5. The common frame 40 is in this case shown by way of example in the style of an MS-Windows window. In the frame 40 the operating system processes running in parallel on the frontend side, which processes were created by the frontend layers 9 of the applications 7a to 7c with the associated frontend-side container instances 17 and 16, are each assigned an output field—shown by way of example in the style of a tab. To express it more graphically, a separate operating system process therefore runs in each tab. In the diagram according to FIG. 5, for example, the process assigned to the application 7a is displayed in the foreground, while the processes assigned to the applications 7b and 7c run in the background of the screen output.

By being displayed in the common frame the operating system processes assigned to the applications 7a-7c are represented as a single process. The user can therefore switch between these processes, for example by means of a mouse click, without noticing the process or application changeover.

Switching from process to process or, as the case may be, from application to application is effected by means of algorithms which the container instance 17 makes available within the scope of the user interface 18.

As can be gathered from FIG. 3, the process connection module 19 and the higher-order container instance 17 started by it also connect in particular processes that run on different versions V1, V2 of the application platform 5 and/or use different protocol versions P1,P2. By this means it is ensured in particular that the output behavior of the applications 7a-7c does not change fundamentally as a result of an update of the application platform 5 and partial performed migration of the applications 7a-7c running thereon. Rather, it is suggested to the user by the process connection module 19 that the applications 7a-7c operate like a single process at least on the frontend side even after partial migration to the new version V2.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, non-transitory computer readable medium and non-transitory computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory storage medium or non-transitory computer readable medium, is adapted to store information and is adapted to interact with a data processing facility or computer device to execute the program of any of the above mentioned embodiments and/or to perform the method of any of the above mentioned embodiments.

The non-transitory computer readable medium or non-transitory storage medium may be a built-in medium installed inside a computer device main body or a removable non-transitory medium arranged so that it can be separated from the computer device main body. Examples of the built-in non-transitory medium include, but are not limited to, rewriteable non-volatile memories, such as ROMs and flash memories, and hard disks. Examples of the removable non-transitory medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

LIST OF REFERENCE SIGNS

1 Data processing arrangement
2 Client
3 Server
4 (Data communication) network
5 Application platform
6 Operating system
7a,b,c Applications
8 Runtime environment
9 Frontend layer
10 Backend layer
11 API
12 Update module
13 Application start module
14 Version management module
15 Container start module
16 Container instance
17 Container instance
18 User interface
19 Process connection module
20 Step
21 Step
22 Step
23 Arrow
24 Step
25 Step
26 Arrow
27 Arrow
28 Step
29 Step
30 Step
31 Arrow
32 Step
33 Step
34 Arrow
35 Arrow
36 Arrow
40 Frame
M Migration
P1 Protocol version
P2 Protocol version
V1 Version
V2 Version

What is claimed is:

1. A method for operating a data processing arrangement on which an application platform is implemented along with at least one application, the at least one application being executable on the application platform by accessing at least one application programming interface (API) of the application platform, the method comprising:

checking, by an update module in the course of a change of version of the application platform or of a part of the platform, whether a more recent version of the application platform or part of the platform is consistent with a relatively older version of the application platform or part of the platform by comparing specification criteria and runtime behavior of an API included in the more recent version of the application platform with specification criteria and runtime behavior of an API included in the relatively older version of the application platform, the runtime behavior being determined based on at least a response time associated with invocation of an associated API or an accuracy of return values generated therefrom; and based on the checking of the consistency between the APIs of the more recent version and the older version of the application platform or a part thereof, overwriting the relatively older version of the application platform or part of the platform with the more recent version thereof if said API included in the more recent version of the platform is consistent in terms of the specification criteria and the runtime behavior with said API included in the older version of the platform, and installing the more recent version of the platform or at least its programming interface, in parallel with the relatively older version of the platform or its programming interface if said API included in the more recent version of the platform is inconsistent in terms of the specification criteria and the runtime behavior with said API included in the older version of the platform.

2. The method as claimed in claim 1, wherein during the loading of an application of the at least one application, a check is carried out by a version management module to determine with which of the more recent and existing relatively older version of said application is compatible, and wherein the version management module assigns to said application, the at least one programming interface of the corresponding version.

3. The method as claimed in claim 2, wherein an instance of a container of the application platform is assigned per application layer to each running application by the version management module, wherein the version management module communicates with container instances of each version of the application platform by way of a specific protocol, and wherein multiple versions of the version management module are implemented in parallel, each using different protocol versions.

4. The method as claimed in claim 3, wherein requests for starting or managing container instances are always addressed initially to the most recent version of the version management module, wherein a check is carried out by said version of the version management module to determine whether said version is compatible with the relevant container instance in terms of the protocol version supported by it, and wherein if incompatibility is established, the request is passed on by said version of the version management module to a compatible and relatively older version of the version management module.

5. The method as claimed in claim 2, wherein the at least one application comprises a frontend layer and a backend layer, and wherein the frontend layer and the backend layer are each provided with at least one programming interface by the application platform, the frontend layer and the backend layer of the same application always being provided with programming interfaces of the same version by the version management module.

6. The method as claimed in claim 5, wherein the frontend layer and the backend layer of the same application are provided with identical programming interfaces.

7. The method as claimed in claim 2, wherein a plurality of operating system processes running in parallel on the application platform are generated as a result of the execution of a plurality of applications, and wherein a process connection module generates an inter-process user interface by which the parallel-running operating system processes collectively interact with a user of the data processing arrangement.

8. The method as claimed in claim 7, wherein a common frame for the parallel-running operating system processes is provided by the inter-process user interface.

9. The method as claimed in claim 1, wherein the at least one application comprises a frontend layer and a backend layer, and wherein the frontend layer and the backend layer are each provided with at least one programming interface by the application platform, the frontend layer and the backend layer of the same application always being provided with programming interfaces of the same version by the version management module.

10. The method as claimed in claim 9, wherein the frontend layer and the backend layer of the same application are provided with identical programming interfaces.

11. The method as claimed in claim 1, wherein a plurality of operating system processes running in parallel on the application platform are generated as a result of the execution of a plurality of applications, and wherein a process connection module generates an inter-process user interface by which the parallel-running operating system processes collectively interact with a user of the data processing arrangement.

12. The method as claimed in claim 11, wherein a common frame for the parallel-running operating system processes is provided by the inter-process user interface.

13. A non-transitory computer readable medium including program segments for, when executed on a computer device, causing the computer device to implement the method of claim 1.

14. The method as claimed in claim 1, wherein the at least one application includes at least a first application and a second application that are each distributed applications having a frontend layer and a backend layer, and the method further comprises:
assigning the frontend layer and the backend layer of the first application to a first one of the more recent and the relatively older versions of the API and the frontend layer and the backend layer of the second application to a second one of the more recent and the relatively older versions of the API;
encapsulating the front end layer and the backend layer of the first application and the front end layer and the backend layer of the second application in identical first container instances and second container instances, respectively; and
generating an inter-process user interface configured to allow a user to interact with the frontend layers of the first and second applications running different versions of the API within a single container.

15. The method as claimed in claimed 14, wherein the installing in parallel installs, on a front end client device, the first one of the more recent and the relatively older versions of the API, one of the first container instances and a first version of a management module supporting a first protocol in parallel with the second one of the more recent and the relatively older versions of the API, one of the second container instances and a second version of the management module supporting a second protocol.

16. An application platform implemented on a data processing arrangement including at least a memory and a processor, comprising:
at least one application programming interface (API), by accessing which at least one application is executable on the application platform; and
an update module, configured to check using the processor, in the course of a change of version of the application platform or a part of the platform, whether a more recent version of the application platform or the part of the platform is consistent with a relatively older version of the application platform or the part of the platform by comparing specification criteria and runtime behavior of an API included in the more recent version of the application platform with specification criteria and runtime behavior of an API included in the relatively older version of the application platform, the runtime behavior being determined based on at least a response time associated with invocation of an associated API or an accuracy of return values generated therefrom, and based on the check of the consistency between APIs of the more recent version and the older version of the application platform or a part thereof,
overwrite, via the processor, the relatively older version of the application platform or part of the platform with the more recent version thereof if said API included in the more recent version of the platform is consistent in terms of the specification criteria and the runtime behavior with said API included in the older version of the platform, and
install, via the processor, the more recent version of the platform or at least its programming interface in parallel with the relatively older version of the platform or its programming interface if said API included in the more recent version of the platform is inconsistent in terms of the specification criteria and the runtime behavior with said API included in the older version of the platform.

17. The application platform as claimed in claim 16, further comprising:
a version management module, configured to check, during loading of an application, with which of the more recent and existing relatively older version said application is compatible, and to starting the at least one programming interface of the corresponding version.

18. The application platform as claimed in claim 17, configured to assign one instance of a container of the application platform per application layer to each running application, wherein the version management module is configured to communicate with container instances of each version of the application platform by way of a specific protocol, and wherein multiple versions of the version management module are implemented in parallel, each of them using different protocol versions.

19. The application platform as claimed in claim 18, wherein the multiple versions of the version management module are implemented in cascaded form such that requests for starting or managing container instances are always addressed initially to the most recent version of the version management module, said version of the version management module being configured to check whether it is compatible with the relevant container instance in terms of the protocol version supported by it, and for passing on the request to a compatible older version of the version management module if incompatibility is established.

20. The application platform as claimed in claim 16, configured to support multi-layer applications, each including a frontend layer and a backend layer, by providing at least one programming interface for each of the frontend and the backend layers, wherein the version management module is configured to provide the frontend layer and the backend layer of the same application always with programming interfaces of the same version.

21. The application platform as claimed in claim 20, wherein the version management module is configured to provide the frontend layer and the backend layer of the same application with identically structured programming interfaces.

22. The application platform as claimed in claim 16, configured to allow a plurality of operating system processes generated as a result of the execution of a plurality of applications to run in parallel, wherein the application platform additionally includes a process connection module which is embodied for generating an inter-process user interface, by which the parallel-running operating system processes collectively interact with a user of the data processing arrangement.

23. The application platform as claimed in claim 22, wherein the inter-process user interface is embodied for providing a common frame for the parallel-running operating system processes.

* * * * *